United States Patent
Phan et al.

(10) Patent No.: US 10,743,235 B2
(45) Date of Patent: Aug. 11, 2020

(54) SUPPORT FOR MINIMIZATION OF SERVICE INTERRUPTION WITH DEVICE-TO-DEVICE BASED USER-EQUIPMENT-TO-NETWORK RELAY

(71) Applicant: Nokia Technologies Oy, Espoo (FI)

(72) Inventors: Vinh Van Phan, Oulu (FI); Ling Yu, Kauniainen (FI); Manivannan Thyagarajan, Coppell, TX (US); Haitao Li, Beijing (CN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/579,661

(22) PCT Filed: Jun. 11, 2015

(86) PCT No.: PCT/CN2015/081244
§ 371 (c)(1),
(2) Date: Dec. 5, 2017

(87) PCT Pub. No.: WO2016/197365
PCT Pub. Date: Dec. 15, 2016

(65) Prior Publication Data
US 2018/0176850 A1    Jun. 21, 2018

(51) Int. Cl.
*H04W 40/22*    (2009.01)
*H04W 88/04*    (2009.01)
*H04W 76/30*    (2018.01)

(52) U.S. Cl.
CPC ........... *H04W 40/22* (2013.01); *H04W 76/30* (2018.02); *H04W 88/04* (2013.01)

(58) Field of Classification Search
None
See application file for complete search history.

(56) References Cited

U.S. PATENT DOCUMENTS

2009/0190538 A1* 7/2009 Hasegawa ............. H04W 76/28
                                                370/329
2010/0238854 A1* 9/2010 Kazmi ..................... H04B 7/155
                                                370/315

(Continued)

FOREIGN PATENT DOCUMENTS

| CN | 103327550 A | 9/2013 |
| EP | 2833694 A2 | 2/2015 |
| WO | 2015/026200 A1 | 2/2015 |

OTHER PUBLICATIONS

International Search Report and Written Opinion received for corresponding Patent Cooperation Treaty Application No. PCT/CN2015/081244, dated Mar. 16, 2016, 11 pages.

"Revised WI: Enhanced LTE Device to Device Proximity Services", 3GPP TSG-RAN meeting #67, RP-150441, Agenda: 11.3.5, Qualcomm Incorporated, Mar. 9-12, 2014, 8 pages.

(Continued)

*Primary Examiner* — Hassan A Phillips
*Assistant Examiner* — Gautam Sharma
(74) *Attorney, Agent, or Firm* — Nokia Technologies Oy

(57) ABSTRACT

Various communication systems may benefit from minimization of service interruption. For example, certain wireless communication systems may benefit from support for minimization of service interruption with device-to-device-based user-equipment-to-network relay. A method can include determining that a layer 3 relay is selected for a remote user equipment. The method can also include sending an indication to a serving access node about the relay selection.

20 Claims, 4 Drawing Sheets

(56) References Cited

U.S. PATENT DOCUMENTS

| | | | | |
|---|---|---|---|---|
| 2010/0272006 | A1* | 10/2010 | Bertrand | H04B 7/2606 370/315 |
| 2010/0322145 | A1* | 12/2010 | Yu | H04B 7/155 370/315 |
| 2011/0170458 | A1* | 7/2011 | Chen | H04B 7/155 370/279 |
| 2012/0002568 | A1* | 1/2012 | Tiirola | H04L 1/0026 370/252 |
| 2013/0044674 | A1 | 2/2013 | Teyeb et al. | |
| 2013/0322325 | A1 | 12/2013 | Hahn et al. | |
| 2014/0016537 | A1 | 1/2014 | Khobare et al. | |
| 2014/0099881 | A1* | 4/2014 | Boudreau | H04B 7/14 455/7 |
| 2014/0126447 | A1* | 5/2014 | Koskinen | H04W 4/08 370/311 |
| 2014/0314057 | A1* | 10/2014 | Van Phan | H04W 56/0045 370/336 |
| 2016/0142944 | A1* | 5/2016 | Cao | H04W 36/0022 455/436 |
| 2016/0157254 | A1* | 6/2016 | Novlan | H04W 72/02 370/329 |
| 2018/0139694 | A1* | 5/2018 | Folke | H04W 48/20 |
| 2018/0146507 | A1* | 5/2018 | Tsuda | H04W 68/005 |

OTHER PUBLICATIONS

"3rd Generation Partnership Project; Technical Specification Group Services and System Aspects; Proximity-based services (ProSe); Stage 2 (Release 12)", 3GPP TS 23.303, V12.4.0, Mar. 2015, pp. 1-63.

"Issues to Support UE2NW Relay UE in D2D Communication", 3GPP TSG-RAN Working Group 2 meeting #89bis, R2-151290, Agenda: 7.5.2, Samsung, Apr. 20-24, 2015, pp. 1-5.

"Consideration of ProSe UE-to-Network Relays", 3GPP TSG-RAN Working Group 2 meeting #89bis, R2-151530, Agenda: 7.5.2, Kyocera, Apr. 20-24, 2015, 8 pages.

"UE to Network Relay Link Handling during Remote UE's Mobility", 3GPP TSG-RAN Working Group 2 meeting #89bis, R2-151233, Agenda: 7.5.2, CATT, Apr. 20-24, 2015, pp. 1-4.

Extended European Search Report received for corresponding European Patent Application No. 15894635.0, dated Sep. 26, 2018, 11 pages.

"Signalling Required for UE-NW Relay Selection", 3GPP TSG-RAN Working Group 2 meeting #90, R2-152462, Agenda: 7.5.1.1, Ericsson, May 25-29, 2015, 18 pages.

Office Action received for corresponding European Patent Application No. 15894635.0, dated May 20, 2019, 5 pages.

* cited by examiner

SUPPORT FOR MINIMIZATION OF SERVICE INTERRUPTION WITH DEVICE-TO-DEVICE BASED USER-EQUIPMENT-TO-NETWORK RELAY

RELATED APPLICATION

This application was originally filed as Patent Cooperation Treaty Application No. PCT/CN2015/081244 filed Jun. 11, 2015.

BACKGROUND

Field

Various communication systems may benefit from minimization of service interruption. For example, certain wireless communication systems may benefit from support for minimization of service interruption with device-to-device-based user-equipment-to-network relay.

Description of the Related Art

Proximity Services (ProSe)/Device-to-Device (D2D) enhancement is expected to be provided in third generation partnership project (3GPP) release 13 or beyond. The 3GPP rel-13 work item description for ProSe enhancement includes the objective of defining enhancements to D2D communication to support the extension of network coverage using layer 3 (L3)-based user equipment (UE)-to-network relays, including service continuity (if needed), based on Release 12 D2D communication, considering applicability to voice and video.

ProSe UE-to-Network relays were intended to address situations in which remote UE need to have and maintain the evolved packet system (EPS) network access connection to the remote PS service server. The EPS network access connection of the remote UE is provided using ProSe UE-to-Network Relay which is based on L3 IP routing and not L2 E-UTRAN access, as specified in 3GPP technical specification (TS) 23.303, which is hereby incorporated herein by reference in its entirety. That is, conventionally the serving eNB need not know and control the actual data relayed by a selected relay UE that has an adequate radio access connection with the serving eNB. Hence, the EPS network access connection of the remote UE using ProSe UE-to-Network relay is referred to as L3 relay connection for short.

For ProSe UE-to-Network relay there is not a standard way of minimization of service interruption for two cases: a case when the UE is moving from in-coverage to out-of-coverage and a case when the UE is moving from out-of-coverage to in-coverage.

For the first case, namely when the remote UE is moving from in-coverage to out-of-coverage, the remote UE is likely to have a regular cellular access connection for an ongoing service before having a need for using ProSe UE-to-Network relay to maintain the network connection for the ongoing service. Note that RAN2 also considers possible relay selection for the remote UE while still being in coverage. It implies that the remote UE may make the L3 relay connection via the selected relay UE before breaking the radio connection to the serving eNB as it is moving out of the network coverage.

For the second case, namely when the remote UE is moving from out-of-coverage to in-coverage the remote UE is likely to have a network connection using L3 ProSe UE-to-Network relay via a selected relay UE for an ongoing service before having a need or being forced to use regular cellular access for the ongoing service whenever the cellular access condition is suitable.

SUMMARY

According to certain embodiments, a method can include determining that a layer 3 relay is selected for a remote user equipment. The method can also include sending an indication to a serving access node about the relay selection.

In certain embodiments, a method can include receiving, at an access node, an indication of a remote user equipment having an layer 3 relay selection. The method can also include sending an indication to a network entity regarding the relay selection. The method can further include configuring the remote user equipment with at least one extended discontinuous reception period.

A method, according to certain embodiments, can include determining that minimizing service interruption for a remote user equipment is needed. The method can also include sending an indication to an access node that minimizing service interruption for the remote user equipment is determined as needed upon establishment of radio connection for the remote user equipment, regarding a switch to or from layer 3 relay.

A method, in certain embodiments, can include receiving, at an access node, in a cause information element of a radio resource control connection request to the access node, an indication that minimizing service interruption for the remote user equipment is determined as needed regarding a switch to or from layer 3 relay. The method can also include at least one of requesting the network entity to perform switching from the layer 3 relay to cellular access mode for the remote user equipment, or performing switching from the layer 3 relay to cellular access mode for the remote user equipment.

According to certain embodiments, an apparatus can include means for determining that a layer 3 relay is selected for a remote user equipment. The apparatus can also include means for sending an indication to a serving access node about the relay selection.

In certain embodiments, an apparatus can include means for receiving, at an access node, an indication of a remote user equipment having an layer 3 relay selection. The method can also include means for sending an indication to a network entity regarding the relay selection. The method can further include means for configuring the remote user equipment with at least one extended discontinuous reception period.

An apparatus, according to certain embodiments, can include means for determining that minimizing service interruption for a remote user equipment is needed. The apparatus can also include means for sending an indication to an access node that minimizing service interruption for the remote user equipment is determined as needed upon establishment of radio connection for the remote user equipment, regarding a switch to or from layer 3 relay.

An apparatus, in certain embodiments, can include means for receiving, at an access node, in a cause information element of a radio resource control connection request to the access node, an indication that minimizing service interruption for the remote user equipment is determined as needed regarding a switch to or from layer 3 relay. The apparatus can also include at least one of means for requesting the network entity to perform switching from the layer 3 relay to cellular access mode for the remote user equipment, or means for performing switching from the layer 3 relay to cellular access mode for the remote user equipment.

An apparatus, according to certain embodiments, can include at least one processor and at least one memory including computer program code. The at least one memory and the computer program code can be configured to, with the at least one processor, cause the apparatus at least to determine that a layer 3 relay is selected for a remote user equipment. The at least one memory and the computer program code can also be configured to, with the at least one processor, cause the apparatus at least to send an indication to a serving access node about the relay selection.

According to certain embodiments, an apparatus can include at least one processor and at least one memory including computer program code. The at least one memory and the computer program code can be configured to, with the at least one processor, cause the apparatus at least to determine that minimizing service interruption for a remote user equipment is needed. The at least one memory and the computer program code can be configured to, with the at least one processor, cause the apparatus at least to send an indication to an access node that minimizing service interruption for the remote user equipment is determined as needed upon establishment of radio connection for the remote user equipment, regarding a switch to or from layer 3 relay.

An apparatus, in certain embodiments, can include at least one processor and at least one memory including computer program code. The at least one memory and the computer program code can be configured to, with the at least one processor, cause the apparatus at least to receive, at an access node, an indication of a remote user equipment having an layer 3 relay selection. The at least one memory and the computer program code can also be configured to, with the at least one processor, cause the apparatus at least to send an indication to a network entity regarding the relay selection. The at least one memory and the computer program code can further be configured to, with the at least one processor, cause the apparatus at least to configure the remote user equipment with at least one extended discontinuous reception period.

In certain embodiments, an apparatus can include at least one processor and at least one memory including computer program code. The at least one memory and the computer program code can be configured to, with the at least one processor, cause the apparatus at least to receive, at an access node, in a cause information element of a radio resource control connection request to the access node, an indication that minimizing service interruption for the remote user equipment is determined as needed regarding a switch to or from layer 3 relay. The at least one memory and the computer program code can also be configured to, with the at least one processor, cause the apparatus at least to perform at least one of requesting the network entity to perform switching from the layer 3 relay to cellular access mode for the remote user equipment, or performing switching from the layer 3 relay to cellular access mode for the remote user equipment.

A computer program product can, according to certain embodiments, be encoded with instructions for performing a process. The process can be any of the above-described methods.

A non-transitory computer-readable medium can, in certain embodiments, be encoded with instructions that, when executed in hardware, perform a process. The process can be any of the above-described methods.

BRIEF DESCRIPTION OF THE DRAWINGS

For proper understanding of the invention, reference should be made to the accompanying drawings, wherein.

DETAILED DESCRIPTION

Figure 1:
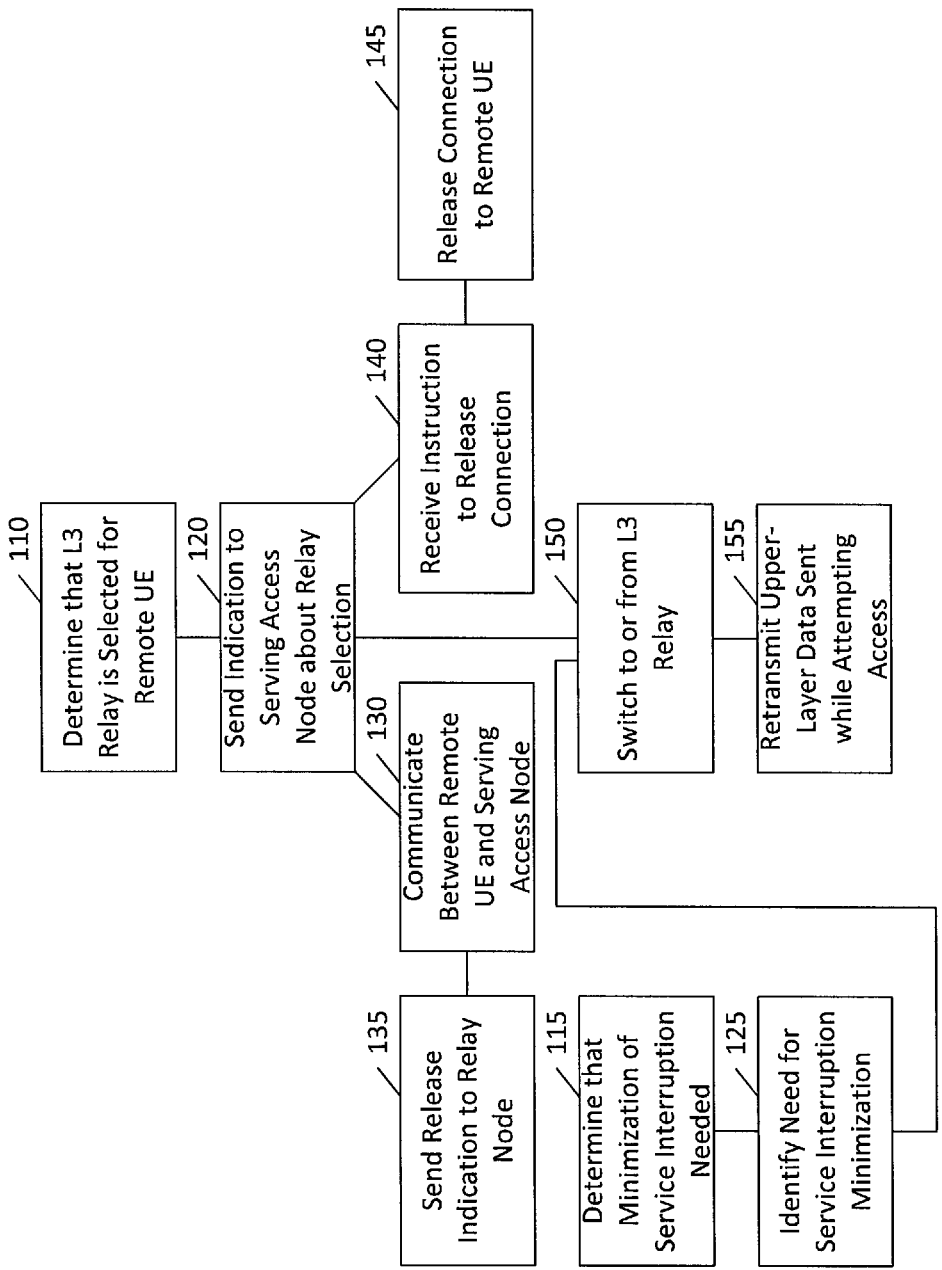
FIG. 1 illustrates a method according to certain embodiments.

Certain embodiments provide enhancements to a serving network, including both radio access network (RAN) and core network (CN) functions, as well as enhancements to user equipment (UE). These enhancements may facilitate potential minimization of service interruption for cases with L3 ProSe UE-to-Network relay. Moreover, certain embodiments may provide a minimum of involvement of the serving access node, such as an evolved node B (eNB).

In regard to the first case mentioned above, when the remote UE, being in radio resource control (RRC) CONNECTED mode, is moving from in-coverage to out-of-coverage, a potential radio link failure (RLF) can be expected for the remote UE even if the remote UE might find a relay UE and might establish a relay connection with the selected relay UE. A relay UE is provided as one example a relay node, although other relay nodes such as relay access points are also permitted. For minimizing service interruption for the remote UE, there may be a need for maintaining L3 context of the remote UE after an unrecovered RLF for the remote UE or a mode switch between the regular cellular access mode and the L3 relay mode for the remote UE.

Thus, when the remote UE selects the L3 relay and establishes a connection with the relay UE (or other relay node) before RLF is detected between the remote UE and the serving eNB, in certain embodiments either the remote UE or the selected relay UE or both may indicate to the serving eNB about the relay selection. This indication may include information about the selected relay UE and/or the remote UE. For example, the information may include a node identifier (ID). Among others, these IDs may include the selected relay UE's and/or the remote UE's source C-RNTIs in the previous serving eNB. The information may also or alternatively include other discoverable context of the selected relay UE and/or the remote UE, and the security context of the selected relay UE's and/or the remote UE's in the previous serving cell. The security context or other information can be used by the connected serving eNB to verify the UE's security context. The serving eNB can then pass the access control as well as allocate/update new security keys for cellular link and/or the relay link, if needed.

The serving eNB can then indicate to MME about the remote UE having the L3 relay selection and can configure the remote UE with at least one extended DRX period. This indication to the MME may be in order for the network to be aware that the remote UE is not to be reached with the regular access mode until further notice while providing the remote UE with a possibility to return to using the current regular cellular access within the configured extended DRX period, if that is determined to be more suitable. Such an arrangement may enhance robustness of mobile connection for the remote UE.

Another enhancement may be to enhance the MME's paging. For example, certain embodiments may enhance the "coverage" of mobile terminated (MT) call, for remote UE out of regular cellular access but with connection of relay UE. For example, if the MME is provided with the relay node's information, the MME can page the corresponding relay node(s) together with the wanted remote UE. This may involve enhancement to the relay node discovery message to include the paging indication for certain remote UE.

If the remote UE does not come back and re-establish the RRC connection to the serving network using the regular access mode within the configured extended DRX period then the serving eNB and the remote UE will release the active radio contexts. The indication of the relay selection and establishment may be initiated from the CN back to the serving eNB. In this option, during the establishment of the L3 relay connection for the remote UE via the EPS connection of the relay UE, the remote UE may indicate to the ProSe control entity of the serving network the current active UE contexts associated with the regular cellular access service and the serving eNB. Thus, when the L3 relay connection for the remote UE is established, the ProSe control entity of the serving network may initiate the aforementioned indication back to the serving MME and eNB to release the remote UE.

When the remote UE selects the L3 relay and establishes a connection with a relay UE after a RLF detected but before RLF recovery, the remote UE may decide not to attempt RLF recovery but maintain the current active radio contexts for a preconfigured extended DRX period. The selected relay UE may indicate to the serving eNB about the relay selection and the serving eNB may operate as described above.

In regard to the second case mentioned above, when the remote UE, having a L3 relay connection via a selected relay UE, is moving from out-of-coverage to in-coverage, it may take considerable time for the remote UE to get the initial access from radio detached state. For minimizing service interruption for the remote UE, the remote UE may be assumed to keep the L3 relay connection and transmission until at least getting into RRC CONNECTED state of a serving eNB.

In such a case, in certain embodiments, the remote UE may use a new "cause" in RRC Connection Request if minimizing service interruption for the remote UE is determined as needed and the remote UE may then indicate to the serving eNB about the current L3 relay along with RRC Connection Request. The serving eNB may then request MME to perform switching from the L3 relay to the cellular access mode for the remote UE.

Another option is to have the serving eNB, if the remote UE is requesting connection to the same serving eNB, perform path switching from relay path to the regular cellular path as long as EPS bearers related tunnel IDs and other parameters remain unchanged.

The remote UE may decide to retransmit all the upper-layer data from the instant the UE first attempted to get access to the serving cell. Note that this approach may be used for the re-establishment of the RRC connection within the configured extended DRX period above as well.

The remote UE may send an explicit indication to the relay UE for release. Alternatively, the remote UE may send an implicit indication by stopping sending discovery or control information to the relay UE when the first user plane (UP) data packet is successfully sent to or received from the serving eNB.

The relay UE may be notified for releasing of the remote UE by the serving eNB as well. For example, this notification may be provided upon the UP data packet being successfully sent to or received from the remote UE at the latest. This option can be supported by the serving eNB having sufficient knowledge of all ongoing ProSe UE-to-Network relays being served by the serving eNB and, possibly, by the serving eNB's cooperative neighboring eNBs. The sufficient knowledge may include IDs and other discoverable contexts of the selected relay UE and/or the remote UE.

Furthermore, considering relay UE reselection for the remote UE, a relay UE upon being selected by a remote UE may indicate to the serving eNB that it is to relay for the remote UE with, for example, UE IDs and discoverable contexts of the relay and remote UEs. Thus, the serving eNB may be able to detect that the remote UE is reselecting a new relay UE based on the indication from the potential new relay UE. The serving eNB, upon detecting that the remote UE has reselected the new relay UE, may tell the current relay UE to stop relaying data for the remote UE. The current relay UE may pass the remaining data to be relayed to the remote UE to the serving eNB, so that the serving eNB may further pass that remaining data to the new relay UE to relay for the remote UE. The current relay UE may then be released of the remote UE. The serving eNB may indicate the relay UE reselection of the remote UE to the MME and CN.

The relay UE and the remote UE may be served by different eNBs. In such a case, interactions between these serving eNBs over X2 may be involved. Such communications over the X2 interface between eNBs may be determined based on the indication information from the relay UE and/or remote UE about UE IDs and discoverable context of one another.

When switching between the L3 relay mode and the cellular access mode, possible forwarding of remaining data to be sent to the remote UE during the mode switch between the source or target relay UE and the target or source eNB (which may be the same serving eNB) for minimizing service interruption is technically possible. However, this data forwarding between the relay UE and the eNB may better be of packet data convergence protocol (PDCP) service data units (SDUs) than PDCP packet data units (PDUs) due to mismatch or difference between PDCP PDU format of Uu and that of PC5.

FIG. 1 illustrates a method according to certain embodiments. As shown in FIG. 1, a method can include, at 110, determining that a L3 relay is selected for a remote user equipment. The method can also include, at 120, sending an indication to a serving access node about the relay selection. The access node can be an evolved Node B (eNB). Other kinds of access nodes can include any base station, gateway, access point, or the like.

The indication can include information about at least one of the selected relay node, such as a relay user equipment, or the remote user equipment. For example, the indication can include information only about one of the user equipment or about both of the user equipment. When more than one relay node is being used, the indication can provide information about all or any of the relay nodes.

The indication can include at least one of a node identifier, other discoverable context of the selected relay node and/or the remote user equipment, the security context of the selected relay node and/or the remote user equipment in the previous serving cell, and indication that minimizing service interruption for the remote user equipment is determined as needed or not.

The sending the indication can include identifying, in a cause information element of a radio resource control connection request that minimizing service interruption for the remote user equipment is determined as needed.

The method can also include, at 130, successfully communicating, for example receiving or transmitting, a data packet between the remote user equipment and the serving access node. The method can further include, at 135, sending an explicit or implicit release indication to a relay node based on the successful reception or transmission.

The method can further include, at 140, receiving an instruction from the serving access node to release a connection to the remote user equipment. The method can additionally include, at 145, releasing the connection based on the received instruction.

The method can also include, at 150, switching from the L3 relay to cellular access mode, or from cellular access mode to L3 relay, for the remote user equipment. The method can further include, at 155, retransmitting all upper-layer data from an instant the remote user equipment first attempted to get access to a serving cell until the switching occurs.

In certain embodiments, at 115, the method can include determining that minimizing service interruption for a remote user equipment is needed. The method can then, at 125, include identifying, in a cause information element of a radio resource control connection request to an access node, regarding a switch to or from L3 relay, that minimizing service interruption for the remote user equipment is determined as needed. The method can then proceed to switch to or from L3 relay at 150. Retransmission of upper-layer data can also occur at 160, as mentioned above.

The method of FIG. 1 may be performed by a user equipment. For example, certain aspects of FIG. 1 may be performed by a relay node such as as a relay user equipment and other aspects of FIG. 1 may be performed by a remote user equipment.

Figure 2:
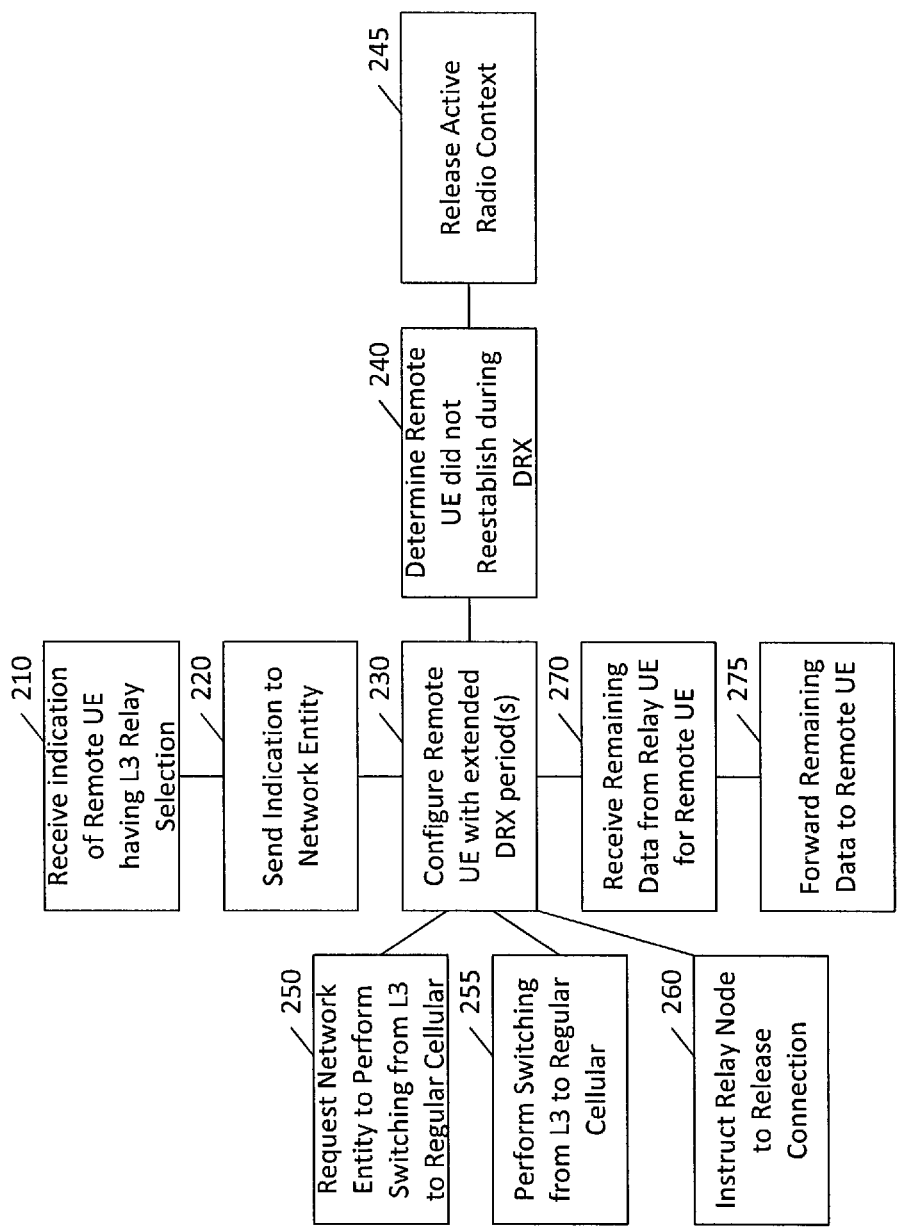
FIG. 2 illustrates another method according to certain embodiments.

FIG. 2 illustrates another method according to certain embodiments. As shown in FIG. 2, a method can include, at 210, receiving, at an access node, an indication of a remote user equipment having an L3 relay selection. The method can also include, at 220, sending an indication to a network entity regarding the relay selection. This sending can be performed by the access node. The method can further include, at 230, configuring the remote user equipment with at least one extended discontinuous reception period. This configuring can also be performed by the access node. The configuring can be responsive to indication received at the access node.

As in FIG. 1, in FIG. 2 the access node can be an evolved Node B. The network entity can be, for example, a mobility management entity. The indication can include information configured to permit the network entity to page at least one corresponding relay node. The indication received at 210 in FIG. 2 may be the same indication sent at 120 in FIG. 1.

As further shown in FIG. 2, at 240, the method can include determining that the remote user equipment did not reestablish a radio resource control connection using regular access mode within the configured at least one extended discontinuous reception period. The method can also include, at 245, releasing an active radio context based on the determination.

The method can further include, at 250, requesting the network entity to perform switching from the L3 relay to cellular access mode for the remote user equipment. Alternatively, the method can include the access node, at 255, performing switching from the L3 relay to cellular access mode for the remote user equipment.

The method can also include, at 260, instructing a relay node, such as a relay user equipment, to release a connection to the remote user equipment upon determination that the connection is to be released. The determination may be made by the access node itself or by another device.

The method can further include, at 270, receiving remaining data from the relay node, such as a user equipment, for the remote user equipment. The method can additionally include, at 275, forwarding the remaining data to a new relay node to relay to the remote user equipment.

It should be noted that FIGS. 1 and 2 are rather to show individual elements or steps according to certain embodiments of various methods, but not necessarily the logical procedures or operations.

Figure 3:
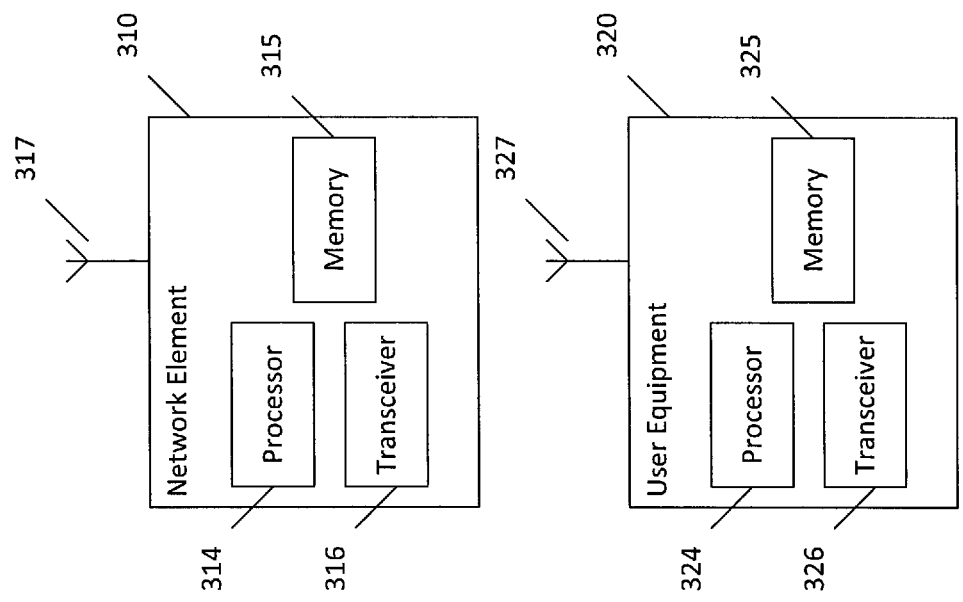
FIG. 3 illustrates a system according to certain embodiments.

FIG. 3 illustrates a system according to certain embodiments of the invention. It should be understood that each block of the flowcharts of FIGS. 1 and 2 may be implemented by various means or their combinations, such as hardware, software, firmware, one or more processors and/ or circuitry. In one embodiment, a system may include several devices, such as, for example, network element 310 and user equipment (UE) or user device 320. The system may include more than one UE 320 (such as one or more relay nodes (for example relay UEs) and one or more remote UEs) and more than one network element 310, although only one of each is shown for the purposes of illustration. A network element can be an access point, a base station, an eNode B (eNB), or any other network element, such as a core network element including, for example a mobility management entity (MME).

Each of these devices may include at least one processor or control unit or module, respectively indicated as 314 and 324. At least one memory may be provided in each device, and indicated as 315 and 325, respectively. The memory may include computer program instructions or computer code contained therein, for example for carrying out the embodiments described above. One or more transceiver 316 and 326 may be provided, and each device may also include an antenna, respectively illustrated as 317 and 327. Although only one antenna each is shown, many antennas and multiple antenna elements may be provided to each of the devices. Other configurations of these devices, for example, may be provided. For example, network element 310 and UE 320 may be additionally configured for wired communication, in addition to wireless communication, and in such a case antennas 317 and 327 may illustrate any form of communication hardware, without being limited to merely an antenna.

Transceivers 316 and 326 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. It should also be appreciated that according to the "liquid" or flexible radio concept, the operations and functionalities may be performed in different entities, such as nodes, hosts or servers, in a flexible manner. In other words, division of labor may vary case by case. One possible use is to make a network element to deliver local content. One or more functionalities may also be implemented as a virtual application that is provided as software that can run on a server.

A user device or user equipment 320 may be a mobile station (MS) such as a mobile phone or smart phone or multimedia device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof. The user device or user equipment 320 may be a sensor or smart meter, or other device that may usually be configured for a single location.

In an exemplifying embodiment, an apparatus, such as a node or user device, may include means for carrying out embodiments described above in relation to FIGS. 1 and 2.

Processors 314 and 324 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors. Additionally, the processors may be implemented as a pool of processors in a local configuration, in a cloud configuration, or in a combination thereof.

For firmware or software, the implementation may include modules or unit of at least one chip set (e.g., procedures, functions, and so on). Memories 315 and 325 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network element 310 and/or UE 320, to perform any of the processes described above (see, for example, FIGS. 1 and 2). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C #, Java, etc., or a low-level programming language, such as a machine language, or assembler. Alternatively, certain embodiments of the invention may be performed entirely in hardware.

Furthermore, although FIG. 3 illustrates a system including a network element 310 and a UE 320, embodiments of the invention may be applicable to other configurations, and configurations involving additional elements, as illustrated and discussed herein. For example, multiple user equipment devices and multiple network elements may be present, or other nodes providing similar functionality, such as nodes that combine the functionality of a user equipment and an access point, such as a relay node. Similarly, the relay node or relay user equipment may be a device installed in a vehicle and consequently may be configured for machine type communication or the like.

Figure 4:
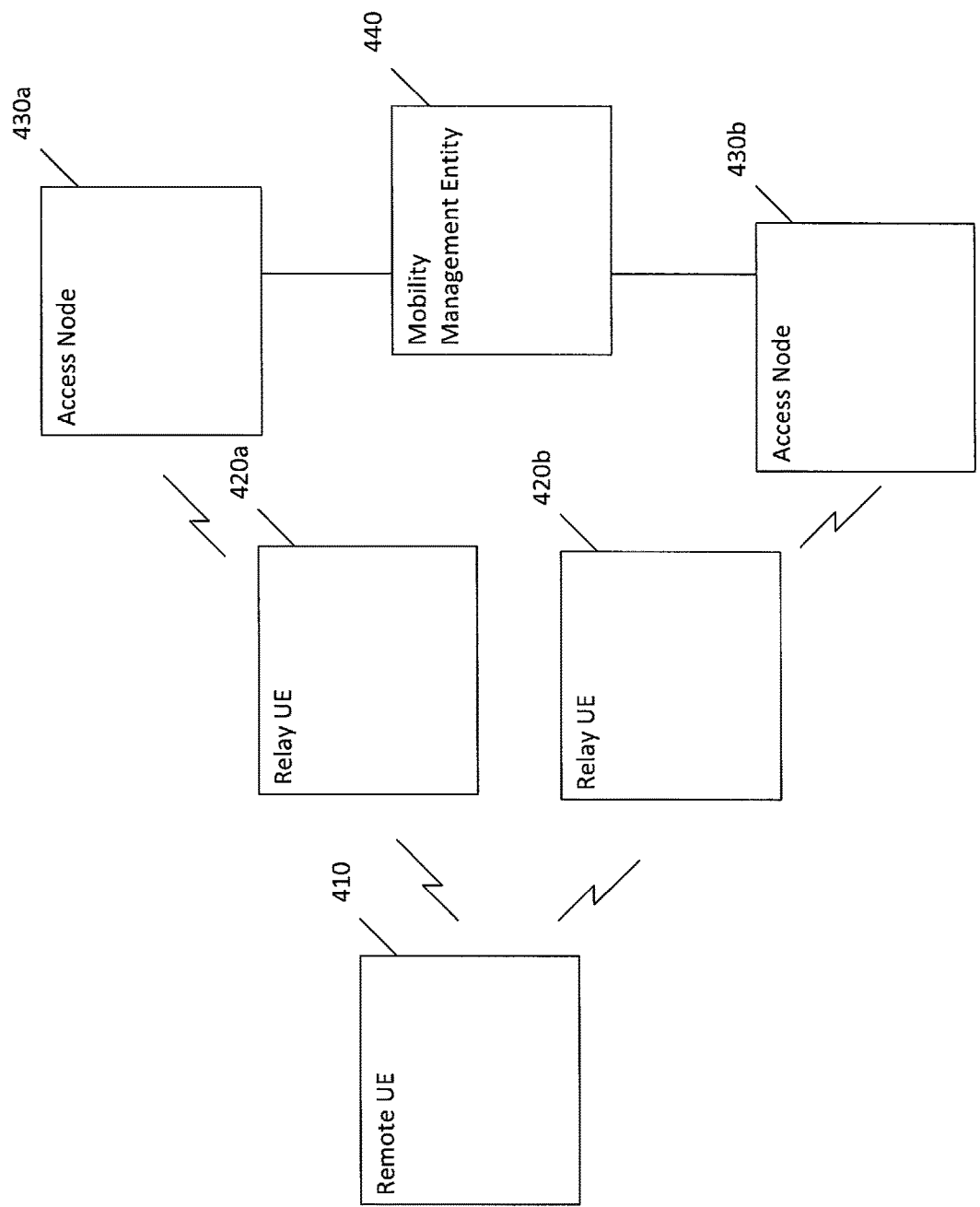
FIG. 4 illustrates a simplified system architecture according to certain embodiments.

FIG. 4 illustrates a simplified system architecture according to certain embodiments. As shown in FIG. 4, a system can include at least one remote user equipment (UE) 410. The system may also include one or more relay nodes, such as relay UEs 420a, 420b. The system may further include one or more access nodes 430a, 430b, which may be eNBs. The system may further include core network elements such as, for example, mobility management entity 440. Other network elements are also permitted.

One having ordinary skill in the art will readily understand that the invention as discussed above may be practiced with steps in a different order, and/or with hardware elements in configurations which are different than those which are disclosed. For example, a relay node may encompass a variety of devices in addition to a relay UE, and may be applicable to V2X communications. For instance, a relay node may be deployed as road-side unit for providing both such UE relay and regular access for targeted UEs or vehicle devices.

Therefore, although the invention has been described based upon these preferred embodiments, it would be apparent to those of skill in the art that certain modifications, variations, and alternative constructions would be apparent, while remaining within the spirit and scope of the invention.

What is claimed is:

1. An apparatus, comprising:
at least one processor; and
at least one memory including computer program code,
wherein the at least one memory and the computer program code are configured to, with the at least one processor, cause the apparatus at least to
receive, at an access node, an indication of a remote user equipment having a layer 3 relay selection, wherein the indication comprises information about at least a selected relay node;
send an indication to a network entity regarding the layer 3 relay selection; and
configure the remote user equipment with at least one extended discontinuous reception period in response to the received indication of the remote user equipment having a layer 3 relay selection.

2. The apparatus of claim 1, wherein the indication regarding the layer 3 relay selection comprises information configured to permit the network entity to page at least one corresponding relay node.

3. The apparatus of claim 1, wherein the indication of the remote user equipment having the layer 3 relay selection is received from at least one of the remote user equipment or a relay node.

4. The apparatus of claim 1, wherein the indication of the remote user equipment having the layer 3 relay selection comprises information about at least the remote user equipment.

5. The apparatus of claim 4, wherein the selected relay node comprises a relay user equipment.

6. The apparatus of claim 5, wherein the layer 3 relay is based on a direct device-to-device communication between the remote user equipment and the relay user equipment.

7. The apparatus of claim 1, wherein the indication of the remote user equipment having the layer 3 relay selection comprises at least one of a node identifier, other discoverable context of a selected relay node and/or the remote user equipment, a security context of the selected relay node and/or the remote user equipment in a previous serving cell, and an indication that minimizing service interruption for the remote user equipment is determined as needed or not.

8. The apparatus of claim 1, wherein the at least one memory and the computer program code are configured to, with the at least one processor, cause the apparatus at least to:
determine that the remote user equipment did not reestablish a radio resource control connection using regular access mode within the configured at least one extended discontinuous reception period; and
release an active radio context based on the determination.

9. The apparatus of claim 1, wherein the at least one memory and the computer program code are configured to, with the at least one processor, cause the apparatus at least to instruct a relay node to release a connection to the remote user equipment upon determination that the connection is to be released.

10. An apparatus, comprising:
at least one processor; and
at least one memory including computer program code, wherein the at least one memory and the computer program code are configured to, with the at least one processor, cause the apparatus at least to
determine that a layer 3 relay is selected for a remote user equipment;
send an indication to a serving access node about the layer 3 relay selection, wherein the indication comprises information about at least a selected relay node; and
configure the remote user equipment with at least one extended discontinuous reception period in response to the determination that the remote user equipment has selected a layer 3 relay.

11. The apparatus of claim 10, wherein the indication about the layer 3 relay selection comprises information about at least the remote user equipment.

12. The apparatus of claim 11, wherein the selected relay node comprises a relay user equipment.

13. The apparatus of claim 12, wherein the layer 3 relay is based on a direct device-to-device communication between the remote user equipment and the relay user equipment.

14. A method, comprising:
receiving, at an access node, an indication of a remote user equipment having a layer 3 relay selection;
sending an indication to a network entity regarding the layer 3 relay selection, wherein the indication comprises information about at least a selected relay node; and
configuring the remote user equipment with at least one extended discontinuous reception period in response to the received indication of the remote user equipment having a layer 3 relay selection.

15. The method of claim 14, wherein the indication regarding the layer 3 relay selection comprises information configured to permit the network entity to page at least one corresponding relay node.

16. The method of claim 14, wherein the indication of the remote user equipment having the layer 3 relay selection is received from at least one of the remote user equipment or a relay node.

17. The method of claim 14, wherein the indication of the remote user equipment having the layer 3 relay selection comprises information about at least the remote user equipment.

18. The method of claim 14, wherein the indication of the remote user equipment having the layer 3 relay selection comprises at least one of a node identifier, other discoverable context of a selected relay node and/or the remote user equipment, a security context of the selected relay node and/or the remote user equipment in a previous serving cell, and an indication that minimizing service interruption for the remote user equipment is determined as needed or not.

19. The method of claim 14, further comprising:
determining that the remote user equipment did not reestablish a radio resource control connection using regular access mode within the configured at least one extended discontinuous reception period; and
releasing an active radio context based on the determination.

20. The method of claim 14, further comprising:
instructing a relay node to release a connection to the remote user equipment upon determination that the connection is to be released.

* * * * *